US012307960B2

(12) United States Patent
Cheng et al.

(10) Patent No.: US 12,307,960 B2
(45) Date of Patent: May 20, 2025

(54) PIXEL CIRCUIT, METHOD FOR DRIVING THE SAME AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Tianyi Cheng, Beijing (CN); Meng Li, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/025,952

(22) PCT Filed: May 26, 2022

(86) PCT No.: PCT/CN2022/095193

§ 371 (c)(1),
(2) Date: Mar. 13, 2023

(87) PCT Pub. No.: WO2023/225931

PCT Pub. Date: Nov. 30, 2023

(65) Prior Publication Data

US 2024/0290255 A1 Aug. 29, 2024

(51) Int. Cl.
*G09G 3/3225* (2016.01)

(52) U.S. Cl.
CPC ... *G09G 3/3225* (2013.01); *G09G 2300/0819* (2013.01); *G09G 2300/0842* (2013.01);
(Continued)

(58) Field of Classification Search
CPC ....... G09G 3/32–3291; G09G 2300/08; G09G 2300/0809; G09G 2300/0819;
(Continued)

(56) References Cited

U.S. PATENT DOCUMENTS

| | | | | |
|---|---|---|---|---|
| 11,011,113 | B1 | 5/2021 | Lu et al. | |
| 2018/0166021 | A1* | 6/2018 | Xi | G09G 3/3241 |

(Continued)

FOREIGN PATENT DOCUMENTS

| | | | |
|---|---|---|---|
| CN | 107342044 | A | 11/2017 |
| CN | 109215585 | A | 1/2019 |

(Continued)

*Primary Examiner* — Nathan Danielsen
(74) *Attorney, Agent, or Firm* — WHDA, LLP

(57) ABSTRACT

A pixel circuit includes a light-emitting element, a first resetting circuit, a control circuit and a driving circuit. The first resetting circuit writes a first initial voltage into a first node under the control of a first resetting control signal. The control circuit controls a control terminal of the driving circuit to be electrically connected to the first node under the control of a first control signal from the first control terminal, and controls the first node to be electrically connected to the first terminal of the driving circuit under the control of a second control signal from a second control terminal. A first terminal of the driving circuit is electrically connected to the light-emitting element, and the driving circuit is configured to drive the light-emitting element to emit light.

20 Claims, 7 Drawing Sheets

(52) U.S. Cl.
CPC ............... *G09G 2300/0861* (2013.01); *G09G 2310/0251* (2013.01); *G09G 2310/08* (2013.01); *G09G 2320/0247* (2013.01); *G09G 2340/0435* (2013.01)

(58) Field of Classification Search
CPC ... G09G 2300/0842; G09G 2300/0861; G09G 2310/0243; G09G 2310/0251; G09G 2310/0267; G09G 2310/06; G09G 2310/08; G09G 2320/0233; G09G 2320/0242; G09G 2320/0247; G09G 2320/04; G09G 2340/0435
See application file for complete search history.

(56) References Cited

U.S. PATENT DOCUMENTS

| | | | | |
|---|---|---|---|---|
| 2018/0174525 | A1* | 6/2018 | Kim | G09G 3/3291 |
| 2022/0157238 | A1* | 5/2022 | Wang | G09G 3/3233 |
| 2022/0223107 | A1* | 7/2022 | Chen | G09G 3/3258 |
| 2022/0383813 | A1* | 12/2022 | Wang | G09G 3/3266 |
| 2024/0169904 | A1* | 5/2024 | Liu | G09G 3/3258 |
| 2024/0169911 | A1* | 5/2024 | Feng | G09G 3/3233 |

FOREIGN PATENT DOCUMENTS

| | | | |
|---|---|---|---|
| CN | 111354314 | A | 6/2020 |
| CN | 112992071 | A | 6/2021 |
| CN | 113674690 | A | 11/2021 |
| CN | 113838419 | A | 12/2021 |
| CN | 113838420 | A | 12/2021 |
| CN | 113906495 | A | 1/2022 |
| CN | 114627807 | A | 6/2022 |

* cited by examiner

PIXEL CIRCUIT, METHOD FOR DRIVING THE SAME AND DISPLAY DEVICE

CROSS-REFERENCE TO RELATED APPLICATION

This application is the U.S. national phase of PCT Application No. PCT/CN2022/095193 filed on May 26, 2022, which is incorporated by reference herein in its entirety.

TECHNICAL FIELD

The present disclosure relates to the field of display technology, in particular to a pixel circuit, a method for driving the pixel circuit and a display device.

BACKGROUND

Recently, along with the development of intelligent display technologies, an organic light-emitting diode (OLED) has become one of the research hotspots in display devices. Due to the thinning of the display panel, the narrowing of the bezel and the development of low-frequency technologies of the display screen, it is difficult to realize the optimization design of the display panel.

In the related art, during the operation of a pixel circuit, the hysteresis phenomenon occurs severely, thereby to adversely affect the display effect.

SUMMARY

In a first aspect, the present disclosure provides in some embodiments a pixel circuit, including a light-emitting element, a first resetting circuit, a control circuit and a driving circuit. The first resetting circuit is electrically connected to a first resetting control terminal, a first initial voltage terminal and a first node, and configured to write a first initial voltage from the first initial voltage terminal into the first node under control of a first resetting control signal from the first resetting control terminal. The control circuit is electrically connected to a first control terminal, a second control terminal, the first node, a control terminal of the driving circuit and a first terminal of the driving circuit, and configured to control the control terminal of the driving circuit to be electrically connected to the first node under control of a first control signal from the first control terminal, and control the first node to be electrically connected to the first terminal of the driving circuit under control of a second control signal from the second control terminal. The first terminal of the driving circuit is electrically connected to the light-emitting element, and the driving circuit is configured to drive the light-emitting element to emit light.

Optionally, in at least one embodiment of the present disclosure, the pixel circuit further includes a second resetting circuit. The second resetting circuit is electrically connected to a second resetting control terminal, a second initial voltage terminal and the first node, and configured to write a second initialization voltage from the second initial voltage terminal into the first node under control of a second resetting control signal from the second resetting control terminal.

Optionally, in at least one embodiment of the present disclosure, the pixel circuit further includes an energy storage circuit, a data written-in circuit, a first light-emission control circuit and a second light-emission control circuit. A first terminal of the energy storage circuit is electrically connected to the control terminal of the driving circuit, a second terminal of the energy storage circuit is electrically connected to a first voltage terminal, and the energy storage circuit is configured to store electric energy. The first light-emission control circuit is electrically connected to a light-emission control terminal, the first voltage terminal and a second terminal of the driving circuit, and configured to control the first voltage terminal to be electrically connected to the second terminal of the driving circuit under control of a light-emission control signal from the light-emission control terminal. The second light-emission control circuit is electrically connected to the light-emission control terminal, the first terminal of the driving circuit and a first electrode of the light-emitting element, and configured to control the first terminal of the driving circuit to be electrically connected to the first electrode of the light-emitting element under control of the light-emission control signal. The data written-in circuit is electrically connected to a written-in control terminal, a data line and the second terminal of the driving circuit, and configured to write a data voltage from the data line into the second terminal of the driving circuit under control of a written-in control signal from the written-in control terminal. A second electrode of the light-emitting element is electrically connected to a second voltage terminal.

Optionally, in at least one embodiment of the present disclosure, the pixel circuit further includes a third resetting circuit. The third resetting circuit is electrically connected to a third resetting control terminal, the first electrode of the light-emitting element and a third initial voltage terminal, and configured to write a third initial voltage from the third initial voltage terminal into the first electrode of the light-emitting element under control of a third resetting control signal from the third resetting control terminal.

Optionally, in at least one embodiment of the present disclosure, the first resetting circuit includes a first transistor, a control electrode of the first transistor is electrically connected to the first resetting control terminal, a first electrode of the first transistor is electrically connected to the first initial voltage terminal, and a second electrode of the first transistor is electrically connected to the first node.

Optionally, in at least one embodiment of the present disclosure, the control circuit includes a second transistor and a third transistor. A control electrode of the second transistor is electrically connected to the first control terminal, a first electrode of the second transistor is electrically connected to the first node, and a second electrode of the second transistor is electrically connected to the control terminal of the driving circuit. A control electrode of the third transistor is electrically connected to the second control terminal, a first electrode of the third transistor is electrically connected to the first node, and a second electrode of the third transistor is electrically connected to the first terminal of the driving circuit.

Optionally, in at least one embodiment of the present disclosure, the second resetting circuit includes a fourth transistor, a control electrode of the fourth transistor is electrically connected to the second resetting control terminal, a first electrode of the fourth transistor is electrically connected to the second initial voltage terminal, and a second electrode of the fourth transistor is electrically connected to the first node.

Optionally, in at least one embodiment of the present disclosure, the energy storage circuit includes a storage capacitor, the first light-emission control circuit includes a fifth transistor, the second light-emission control circuit includes a sixth transistor, the driving circuit includes a driving transistor, and the data written-in circuit includes a seventh transistor. A control electrode of the fifth transistor is electrically connected to the light-emission control terminal, a first electrode of the fifth transistor is electrically connected to the first voltage terminal, and a second electrode of the fifth transistor is electrically connected to the second terminal of the driving circuit. A control electrode of the sixth transistor is electrically connected to the light-emission control terminal, a first electrode of the sixth transistor is electrically connected to the first terminal of the driving circuit, and a second electrode of the sixth transistor is electrically connected to the first electrode of the light-emitting element. A control electrode of the seventh transistor is electrically connected to the written-in control terminal, a first electrode of the seventh transistor is electrically connected to the data line, and a second electrode of the seventh transistor is electrically connected to the second terminal of the driving circuit. A first terminal of the storage capacitor is electrically connected to the control terminal of the driving circuit, and a second terminal of the storage capacitor is electrically connected to the first voltage terminal. A control electrode of the driving transistor is the control terminal of the driving circuit, a first electrode of the driving transistor is the first terminal of the driving circuit, and a second electrode of the driving transistor is the second terminal of the driving circuit.

Optionally, in at least one embodiment of the present disclosure, the third resetting circuit includes an eighth transistor, a control electrode of the eighth transistor is electrically connected to the third resetting control terminal, a first electrode of the eighth transistor is electrically connected to the third initial voltage terminal, and a second electrode of the eighth transistor is electrically connected to the first electrode of the light-emitting element.

In a second aspect, the present disclosure provides in some embodiments a method for driving the above-mentioned pixel circuit. A display period includes a first resetting stage and a second resetting stage arranged one after another, and the method includes: at the first resetting stage, writing, by the first resetting circuit, the first initial voltage from the first initial voltage terminal into the first node under control of the first resetting control signal, controlling, by the control circuit, the control terminal of the driving circuit to be electrically connected to the first node under control of the first control signal, and controlling, by the control circuit, the first node to be electrically connected to the first terminal of the driving circuit under control of the second control signal; at the second resetting stage, controlling, by the control circuit, the control terminal of the driving circuit to be electrically connected to the first node under control of the first control signal, and controlling, by the control circuit, the first node to be electrically connected to the first terminal of the driving circuit under control of the second control signal.

Optionally, in at least one embodiment of the present disclosure, the pixel circuit further includes a second resetting circuit, and the method further includes: at the second resetting stage, writing, by the second resetting circuit, a second initialization voltage from a second initial voltage terminal into the first node under control of a second resetting control signal.

Optionally, in at least one embodiment of the present disclosure, the pixel circuit further includes an energy storage circuit, a data written-in circuit, a first light-emission control circuit and a second light-emission control circuit, the display period further includes a charging stage and a first light-emission stage after the second resetting stage, and the method further includes: at the charging stage, writing, by the data written-in circuit, a data voltage from a data line into a second terminal of the driving circuit under control of a written-in control signal, controlling, by the control circuit, the control terminal of the driving circuit to be electrically connected to the first node under control of the first control signal, and controlling, by the control circuit, the first node to be electrically connected to the first terminal of the driving circuit under control of the second control signal; at the beginning of the charging stage, controlling, by the driving circuit, the first terminal of the driving circuit to be electrically connected to the second terminal of the driving circuit under control of a potential at the control terminal of the driving circuit, to charge the energy storage circuit via the data voltage, thereby to change the potential at the control terminal of the driving circuit until the first terminal of the driving circuit is electrically disconnected from the second terminal of the driving circuit; at the first light-emission stage, controlling, by the first light-emission control circuit, a first voltage terminal to be electrically connected to the second terminal of the driving circuit under control of a light-emission control signal, controlling, by the second light-emission control circuit, the first terminal of the driving circuit to be electrically connected to a first electrode of the light-emitting element under control of the light-emission control signal, and driving, by the driving circuit, the light-emitting element to emit light.

Optionally, in at least one embodiment of the present disclosure, the pixel circuit further includes a third resetting circuit, the display period further includes a third resetting stage between the second resetting stage and the charging stage, and the method further includes: at the third resetting stage, writing, by the third resetting circuit, a third initial voltage from the third initial voltage terminal into the first electrode of the light-emitting element under control of a third resetting control signal.

Optionally, in at least one embodiment of the present disclosure, during low frequency display, a display period includes a refresh frame and a maintaining frame, the refresh frame is the display period, the maintaining frame includes a fourth resetting stage, a fifth resetting stage, a sixth resetting stage, a seventh resetting stage and a second light-emission stage arranged one after another, and the method further includes: in the maintaining frame, controlling, by the control circuit, the control terminal of the driving circuit to be electrically disconnected from the first node under control of the first control signal from the first control terminal; at the fourth resetting stage, writing, by the first resetting circuit, the first initial voltage from the first initial voltage terminal into the first node under control of the first resetting control signal, and controlling, by the control circuit, the first node to be electrically connected to the first terminal of the driving circuit under control of the second control signal, to write the first initial voltage into the first terminal of the driving circuit; at the fifth resetting stage, writing, by the second resetting circuit, the second initialization voltage from the second initial voltage terminal into the first node under control of the second resetting control signal, and controlling, by the control circuit, the first node to be electrically connected to the first terminal of the driving circuit under control of the second control signal, to write the second initialization voltage into the first terminal of the driving circuit; at the sixth resetting stage, writing, by the third resetting circuit, the third initial voltage from the third initial voltage terminal into the first electrode of the light-emitting element under control of the third resetting control signal; at the seventh resetting stage, writing, by the data written-in circuit, a voltage signal from the data line into the second terminal of the driving circuit under control of the written-in control signal; at the second light-emission stage, controlling, by the first light-emission control circuit, the first voltage terminal to be electrically connected to the second terminal of the driving circuit under control of the light-emission control signal, controlling, by the second light-emission control circuit, the first terminal of the driving circuit to be electrically connected to the first electrode of the light-emitting element under control of the light-emission control signal, and driving, by the driving circuit, the light-emitting element to emit light.

In a third aspect, the present disclosure further provides in some embodiments a display device including the above-mentioned pixel circuit.

DETAILED DESCRIPTION

In order to make the objects, the technical solutions and the advantages of the present disclosure more apparent, the present disclosure will be described hereinafter in a clear and complete manner in conjunction with the drawings and embodiments. Apparently, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, each transistor maybe a triode, a thin film transistor (TFT), a field effect transistor (FET), or any other element having a same characteristic. In order to differentiate two electrodes other than a gate electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
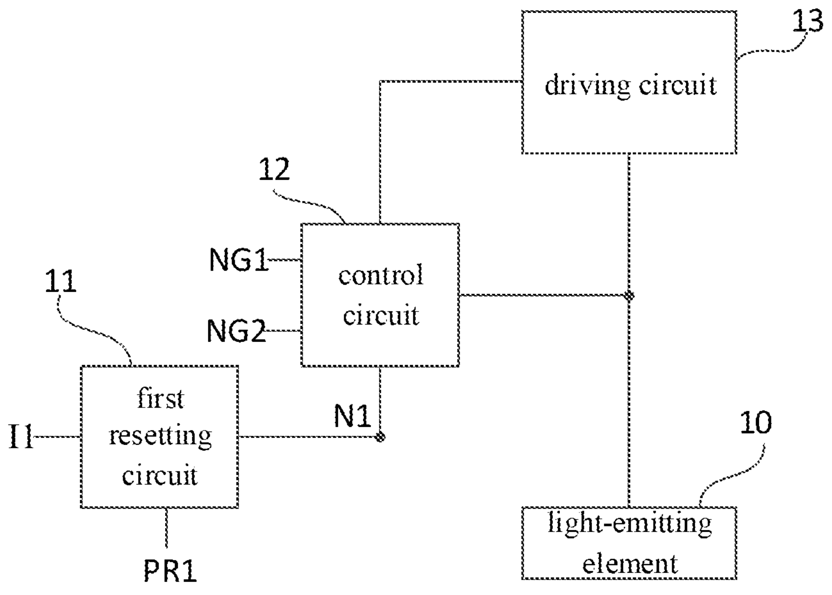
FIG. 1 is a schematic view showing a pixel circuit according to one embodiment of the present disclosure.

As shown in FIG. 1, the present disclosure provides in some embodiments a pixel circuit including a light-emitting element 10, a first resetting circuit 11, a control circuit 12 and a driving circuit 13.

The first resetting circuit 11 is electrically connected to a first resetting control terminal PR1, a first initial voltage terminal I1 and a first node N1, and configured to write a first initial voltage Vi1 from the first initial voltage terminal I1 into the first node N1 under control of a first resetting control signal from the first resetting control terminal PR1.

The control circuit 12 is electrically connected to a first control terminal NG1, a second control terminal NG2, the first node N1, a control terminal of the driving circuit 13 and a first terminal of the driving circuit 13, and configured to control the control terminal of the driving circuit 13 to be electrically connected to the first node N1 under control of a first control signal from the first control terminal NG1, and control the first node N1 to be electrically connected to the first terminal of the driving circuit 13 under control of a second control signal from the second control terminal NG2.

The first terminal of the driving circuit 13 is electrically connected to the light-emitting element 10, and the driving circuit 13 is configured to drive the light-emitting element 10 to emit light.

In at least one embodiment of the present disclosure, a voltage value of the first initial voltage Vi1 may be, but not limited to, larger than or equal to 5V and smaller than or equal to 8V.

During the operation of the pixel circuit in at least one embodiment of the present disclosure, a display period includes a first resetting stage and a second resetting stage arranged one after another.

At the first resetting stage, the first resetting circuit 11 writes the first initial voltage Vi1 from the first initial voltage terminal I1 into the first node N1 under the control of the first resetting control signal, the control circuit 12 controls the control terminal of the driving circuit 13 to be electrically connected to the first node N1 under the control of the first control signal, and the control circuit 12 controls the first node N1 to be electrically connected to the first terminal of the driving circuit 13 under the control of the second control signal.

At the second resetting stage, the control circuit 12 controls the control terminal of the driving circuit 13 to be electrically connected to the first node N1 under control of the first control signal, and the control circuit 12 controls the first node N1 to be electrically connected to the first terminal of the driving circuit 13 under control of the second control signal.

According to the embodiments of the present disclosure, the pixel circuit includes the first resetting circuit 11 and the control circuit 12, at the first resetting stage, the first resetting circuit 11 writes the first initial voltage Vi1 into the first node N1, the control circuit 12 controls the control terminal of the driving circuit 13 to be electrically connected to the first node N1, and controls the first node N1 to be electrically connected to the first terminal of the driving circuit 13, so as to enable a potential at the control terminal of the driving circuit 13 and a potential at the first terminal of the driving circuit 13 to be the first initial voltage Vi1, thereby to apply a bias voltage to a driving transistor of the driving circuit 13, enable the driving transistor of the driving circuit 13 to be in a bias state, mitigate a hysteresis phenomenon, and improve a display effect.

Due to the pixel circuit in the embodiments of the present disclosure, it is able mitigate a flicker phenomenon during low frequency display.

During the low-frequency display, the display period includes a refresh frame and a maintaining frame, during a partial time period of the maintaining frame, the driving transistor of the driving circuit 13 is biased and reset, and during the maintaining frame, a potential at a source electrode of the driving transistor and a potential at the drain electrode of the driving transistor of the driving circuit 13 are consistent with those in the refresh frame, so as to mitigate the flicker phenomenon.

In at least one embodiment of the present disclosure, the display period may be one frame during high frequency display, and the display period may be the refresh frame during the low frequency display.

Figure 2:
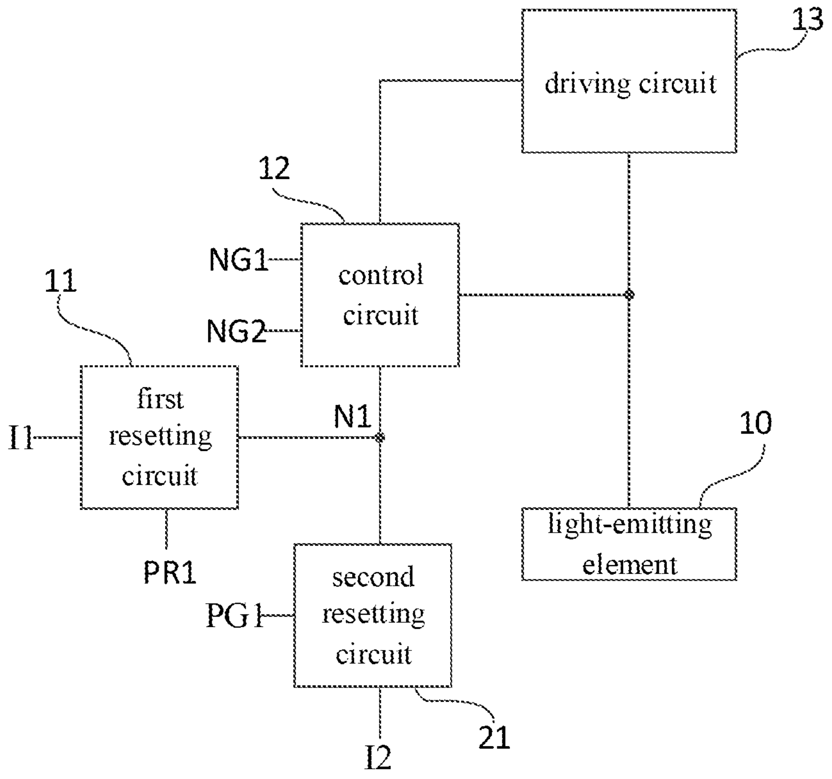
FIG. 2 is another schematic view showing the pixel circuit according to at least one embodiment of the present disclosure.

As shown in FIG. 2, on the basis of the pixel circuit in FIG. 1, the pixel circuit further includes a second resetting circuit 21.

The second resetting circuit 21 is electrically connected to a second resetting control terminal PG1, a second initial voltage terminal I2 and the first node N1, and configured to write a second initialization voltage Vi2 from the second initial voltage terminal I2 into the first node N1 under the control of a second resetting control signal from the second resetting control terminal PG1.

In at least one embodiment of the present disclosure, a voltage value of the second initial voltage Vi2 may be, but not limited to, larger than or equal to −5V and smaller than or equal to −2V.

During the operation of the pixel circuit in FIG. 2, at the second resetting stage, the second resetting circuit 21 writes the second initialization voltage Vi2 from the second initial voltage terminal I2 into the first node N1 under the control of the second resetting control signal, so as to enable the driving transistor to be turned on at the beginning of the charging stage after the second resetting stage for threshold voltage compensation.

Figure 3:
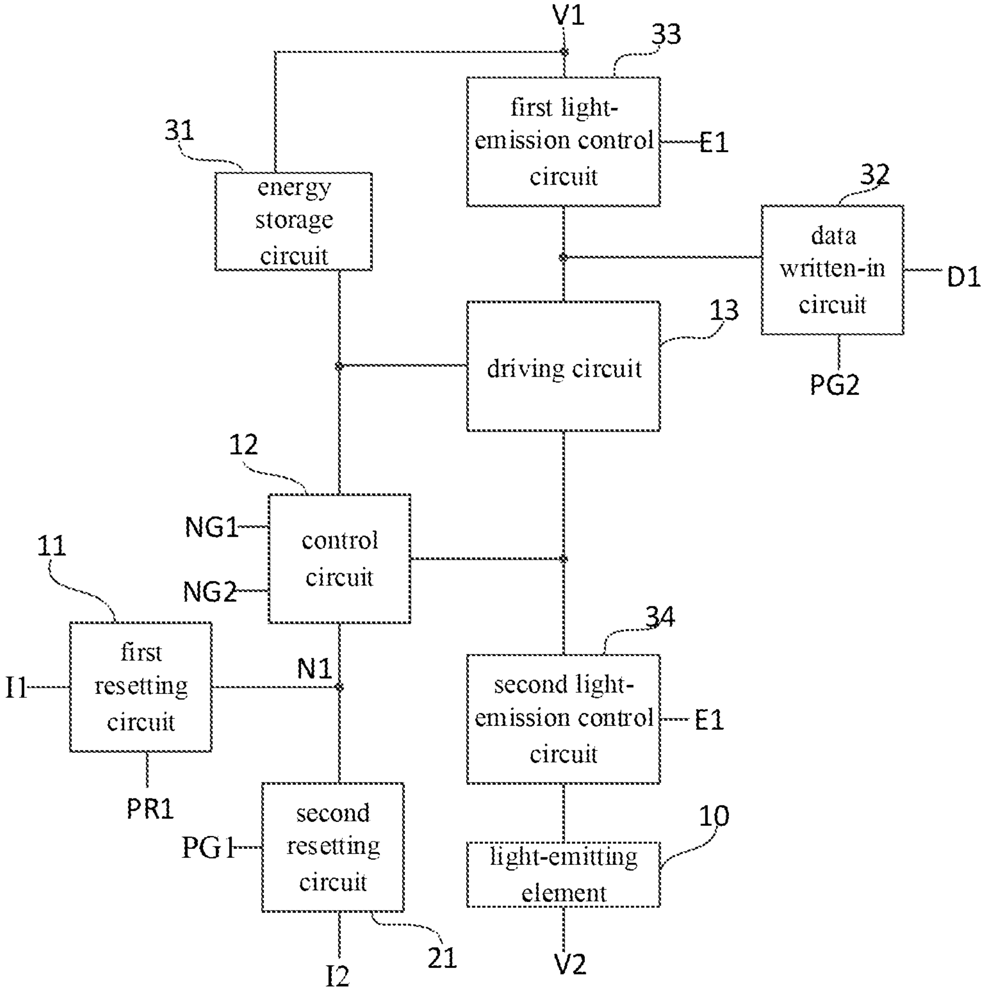
FIG. 3 is yet another schematic view showing the pixel circuit according to at least one embodiment of the present disclosure.

As shown in FIG. 3, on the basis of the pixel circuit in FIG. 2, the pixel circuit further includes an energy storage circuit 31, a data written-in circuit 32, a first light-emission control circuit 33 and a second light-emission control circuit 34.

A first terminal of the energy storage circuit 31 is electrically connected to the control terminal of the driving circuit 13, a second terminal of the energy storage circuit 31 is electrically connected to a first voltage terminal V1, and the energy storage circuit 31 is configured to store electric energy.

The light-emission control circuit 33 is electrically connected to a light-emission control terminal E1, the first voltage terminal V1 and a second terminal of the driving circuit 13, and configured to control the first voltage terminal V1 to be electrically connected to the second terminal of the driving circuit 13 under control of a light-emission control signal from the light-emission control terminal E1.

The second light-emission control circuit 34 is electrically connected to the light-emission control terminal E1, the first terminal of the driving circuit 13 and a first electrode of the light-emitting element 10, and configured to control the first terminal of the driving circuit 13 to be electrically connected to the first electrode of the light-emitting element 10 under control of the light-emission control signal.

The data written-in circuit 32 is electrically connected to a written-in control terminal PG2, a data line D1 and the second terminal of the driving circuit 13, and configured to write a data voltage Vdata from the data line D1 into the second terminal of the driving circuit 13 under control of a written-in control signal from the written-in control terminal PG2.

A second electrode of the light-emitting element 10 is electrically connected to a second voltage terminal V2.

In at least one embodiment of the present disclosure, the first voltage terminal V1 may be, but not limited to, a high voltage terminal, and the second voltage terminal V2 may be, but not limited to, a low voltage terminal.

During the operation of the pixel circuit in FIG. 3, the display period further includes a charging stage and a first light-emission stage after the second resetting stage.

At the charging stage, the data written-in circuit 32 writes the data voltage Vdata from the data line D1 into the second terminal of the driving circuit 13 under the control of the written-in control signal, the control circuit 12 controls the control terminal of the driving circuit 13 to be electrically connected to the first node N1 under the control of the first control signal, the control circuit 12 controls the first node N1 to be electrically connected to the first terminal of the driving circuit 13 under the control of the second control signal.

At the beginning of the charging stage, the driving circuit 13 controls the first terminal of the driving circuit 13 to be electrically connected to the second terminal of the driving circuit 13 under control of the potential at the control terminal of the driving circuit, so as to charge the energy storage circuit 31 via the data voltage Vdata, thereby to change the potential at the control terminal of the driving circuit 13 until the first terminal of the driving circuit 13 is electrically disconnected from the second terminal of the driving circuit 13, and realize the threshold voltage compensation.

At the light-emission stage, the first light-emission control circuit 33 controls the first voltage terminal V1 to be electrically connected to the second terminal of the driving circuit 13 under the control of the light-emission control signal, the second light-emission control circuit 34 controls the first terminal of the driving circuit 13 to be electrically connected to the first electrode of the light-emitting element 10 under control of the light-emission control signal, and the driving circuit 13 drives the light-emitting element 10 to emit light.

Figure 4:
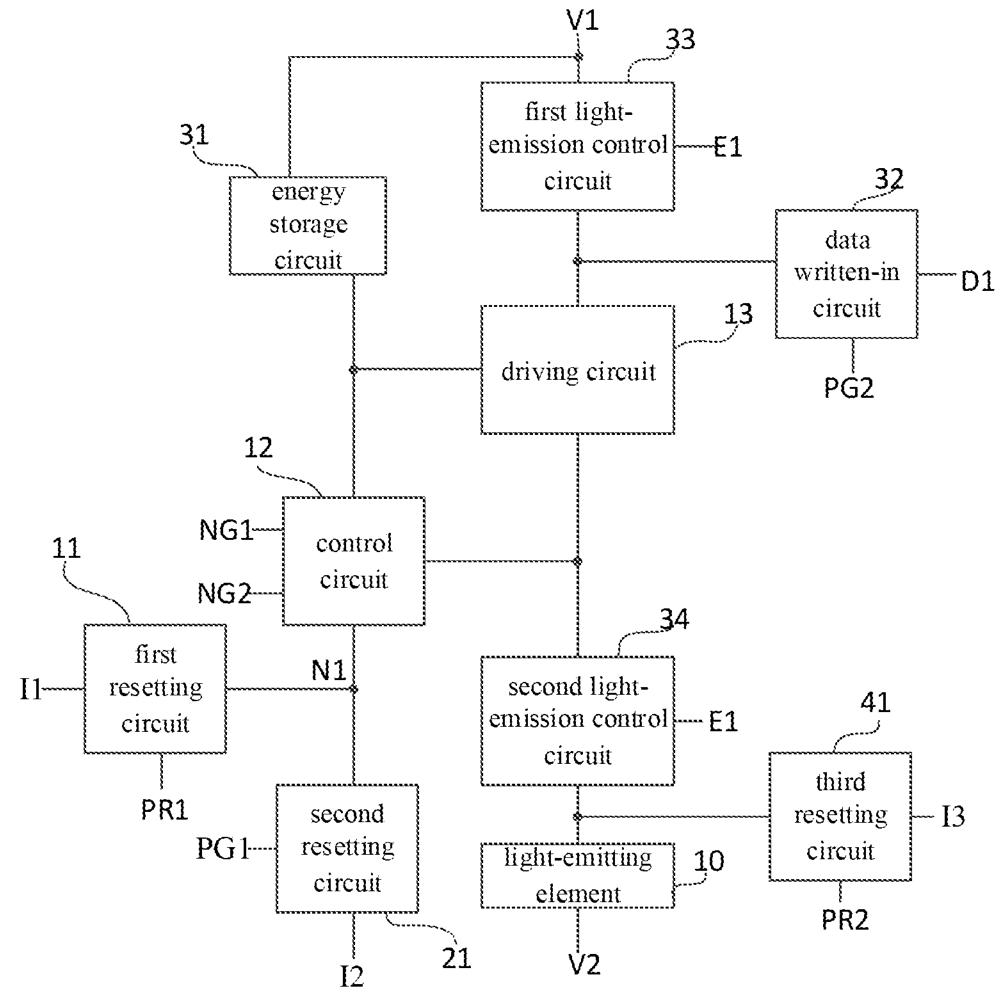
FIG. 4 is a still yet another schematic view showing the pixel circuit according to at least one embodiment of the present disclosure.

As shown in FIG. 4, on the basis of the pixel circuit in FIG. 3, the pixel circuit further includes a third resetting circuit 41.

The third resetting circuit 41 is electrically connected to a third resetting control terminal PR2 and the first electrode of the light-emitting element 10 and a third initial voltage terminal I3, and configured to write a third initial voltage Vi3 from the third initial voltage terminal I3 into the first electrode of the light-emitting element 10 under the control of a third resetting control signal from the third resetting control terminal PR2.

During the operation of the pixel circuit in FIG. 4, the display period further includes a third resetting stage between the second resetting stage and the charging stage.

At the third resetting stage, the third resetting circuit 41 writes the third initial voltage Vi3 from the third initial voltage terminal I3 into the first electrode of the light-emitting element 10 under control of the third resetting control signal, so as to control the light-emitting element 10 not to emit light, and release residual charges at the first electrode of the light-emitting element 10.

In at least one embodiment of the present disclosure, a voltage value of the third initial voltage Vi3 may be, but not limited to, larger than or equal to −5V and smaller than or equal to −2V.

During the operation of the pixel circuit in FIG. 4, the display period includes the refresh frame and the maintaining frame during low frequency display, the refresh frame may be the display period, and the maintaining frame may include a fourth resetting stage, a fifth resetting stage, a sixth resetting stage, a seventh resetting stage and a second light-emission stage arranged one after another.

In the maintaining frame, the control circuit 12 controls the control terminal of the driving circuit 13 to be electrically disconnected from the first node N1 under control of the first control signal from the first control terminal NG1.

At the fourth resetting stage, the first resetting circuit 11 writes the first initial voltage Vi1 from the first initial voltage terminal I1 into the first node N1 under the control of the first resetting control signal. The control circuit 12 controls the first node N1 to be electrically connected to the first terminal of the driving circuit 13 under the control of the second control signal, so as to write the first initial voltage Vi1 into the first terminal of the driving circuit 13, thereby to reset the potential at the first terminal of the driving circuit 13.

At the fifth resetting stage, the second resetting circuit 21, under the control of the second resetting control signal, writes the second initialization voltage Vi2 from the second initial voltage terminal I2 into the first node N1, and the control circuit 12, under the control of the second control signal, controls the first node N1 to be electrically connected to the first terminal of the driving circuit 13, so as to write the second initialization voltage Vi2 into the first terminal of the driving circuit 13.

At the sixth resetting stage, the third resetting circuit 41 writes the third initial voltage Vi3 from the third initial voltage terminal I3 into the first electrode of the light-emitting element 10 under the control of the third resetting control signal, so as to control the light-emitting element 10 not to emit light, and release residual charges at the first electrode of the light-emitting element 10.

At the seventh resetting stage, the data written-in circuit 32 writes a voltage signal from the data line D1 into the second terminal of the driving circuit 13 under control of the written-in control signal.

At the second light-emission stage, the first light-emission control circuit 33 controls the first voltage terminal V1 to be electrically connected to the second terminal of the driving circuit 13 under the control of the light-emission control signal, the second light-emission control circuit 34 controls the first terminal of the driving circuit 13 to be connected to the first electrode of the light-emitting element 10 under control of the light-emission control signal, and the driving circuit 13 drives the light-emitting element 10 to emit light.

During the implementation, at the seventh resetting stage, the voltage signal from the data line D1 may be a data voltage Vdata from the data line D1 at the charging stage, and a voltage value of the data voltage Vdata may be, e.g., greater than or equal to 1V and less than or equal to 6.5V.

Alternatively, at the seventh resetting stage, the voltage signal from the data line D1 may be a resetting voltage signal, and a voltage value of the resetting voltage signal may be greater than or equal to 4.6V and less than or equal to 7V. However, the present disclosure is not limited thereto.

During the operation of the pixel circuit in at least one embodiment of the present disclosure, at the seventh resetting stage, the data written-in circuit 32 writes the voltage signal from the data line D1 into the second terminal of the driving circuit 13 under the control of the written-in control signal, so as to apply a bias voltage to the driving transistor of the driving circuit 13, thereby to enable the driving transistor of the driving circuit 13 to be in a bias state, and mitigate the hysteresis phenomenon.

In at least one embodiment of the present disclosure, when the pixel circuit is in low-frequency display, e.g., a refresh frequency is 1 Hz, the display period may include one refresh frame and maintaining frames after the refresh frame, and at the seventh resetting stage in each of the maintaining frames, the potential at the second terminal of the driving circuit 13 may be reset via the voltage signal from the data line D1, so as to mitigate the hysteresis phenomenon.

During the operation of the pixel circuit in FIG. 4, at the fourth resetting stage, the driving circuit 13 controls the first terminal of the driving circuit 13 to be electrically connected to the second terminal of the driving circuit 13 under the control of the potential of the control terminal of the driving circuit 13. However, the present disclosure is not limited thereto.

When the pixel circuit in FIG. 4 operates in low frequency display, in the maintaining frame, at the fourth resetting stage, the first initial voltage Vi1 is written into the first terminal of the driving circuit 13, so as to reset the potential at the first terminal of the driving circuit 13. At the fifth reset stage, the second initialization voltage Vi2 is written into the first terminal of the driving circuit 13. At the seventh resetting stage, the voltage signal from the data line D1 is written into the second terminal of the driving circuit 13, so that the potential at the first terminal of the driving circuit 13 and the potential at the second terminal of the driving circuit 13 in the maintaining frame are consistent with those in the refresh frame, thereby to mitigate the flicker phenomenon.

Optionally, in at least one embodiment of the present disclosure, the first resetting circuit includes a first transistor, a control electrode of the first transistor is electrically connected to the first resetting control terminal, a first electrode of the first transistor is electrically connected to the first initial voltage terminal, and a second electrode of the first transistor is electrically connected to the first node.

Optionally, in at least one embodiment of the present disclosure, the control circuit includes a second transistor and a third transistor.

A control electrode of the second transistor is electrically connected to the first control terminal, a first electrode of the second transistor is electrically connected to the first node, and a second electrode of the second transistor is electrically connected to the control terminal of the driving circuit.

A control electrode of the third transistor is electrically connected to the second control terminal, a first electrode of the third transistor is electrically connected to the first node, and a second electrode of the third transistor is electrically connected to the first terminal of the driving circuit.

Optionally, in at least one embodiment of the present disclosure, the second resetting circuit includes a fourth transistor, a control electrode of the fourth transistor is electrically connected to the second resetting control terminal, a first electrode of the fourth transistor is electrically connected to the second initial voltage terminal, and a second electrode of the fourth transistor is electrically connected to the first node.

Optionally, in at least one embodiment of the present disclosure, the energy storage circuit includes a storage capacitor, the first light-emission control circuit includes a fifth transistor, the second light-emission control circuit includes a sixth transistor, the driving circuit includes a driving transistor, and the data written-in circuit includes a seventh transistor.

A control electrode of the fifth transistor is electrically connected to the light-emission control terminal, a first electrode of the fifth transistor is electrically connected to the first voltage terminal, and a second electrode of the fifth transistor is electrically connected to the second terminal of the driving circuit.

A control electrode of the sixth transistor is electrically connected to the light-emission control terminal, a first electrode of the sixth transistor is electrically connected to the first terminal of the driving circuit, and a second electrode of the sixth transistor is electrically connected to the first electrode of the light-emitting element.

A control electrode of the seventh transistor is electrically connected to the written-in control terminal, a first electrode of the seventh transistor is electrically connected to the data line, and a second electrode of the seventh transistor is electrically connected to the second terminal of the driving circuit.

A first terminal of the storage capacitor is electrically connected to the control terminal of the driving circuit, and a second terminal of the storage capacitor is electrically connected to the first voltage terminal.

A control electrode of the driving transistor is the control terminal of the driving circuit, a first electrode of the driving transistor is the first terminal of the driving circuit, and a second electrode of the driving transistor is the second terminal of the driving circuit.

Optionally, in at least one embodiment of the present disclosure, the third resetting circuit includes an eighth transistor, a control electrode of the eighth transistor is electrically connected to the third resetting control terminal, a first electrode of the eighth transistor is electrically connected to the third initial voltage terminal, and a second electrode of the eighth transistor is electrically connected to the first electrode of the light-emitting element.

Figure 5:
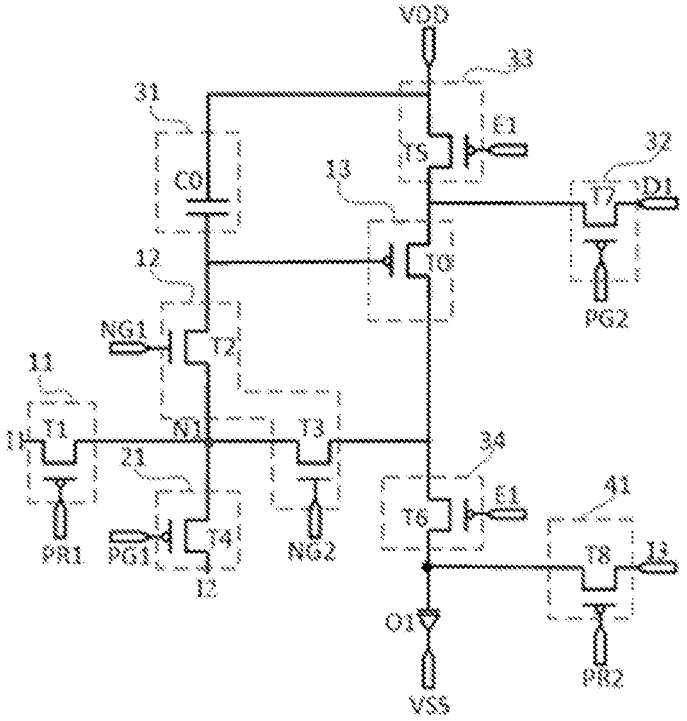
FIG. 5 is a circuit diagram of the pixel circuit according to at least one embodiment of the present disclosure.

As shown in FIG. 5, on the basis of the pixel circuit in FIG. 4, the first resetting circuit 11 includes a first transistor T1, the driving circuit 13 includes a driving transistor T0, and the light-emitting element is an organic light-emitting diode O1.

A gate electrode of the first transistor T1 is electrically connected to the first resetting control terminal PR1, a source electrode of the first transistor T1 is electrically connected to the first initial voltage terminal I1, and a drain electrode of the first transistor T1 is electrically connected to the first node N1.

The control circuit 12 includes a second transistor T2 and a third transistor T3.

A gate electrode of the second transistor T2 is electrically connected to the first control terminal NG1, a source electrode of the second transistor T2 is electrically connected to the first node N1, and a drain electrode of the second transistor T2 is electrically connected to the gate electrode of the driving transistor T0.

A gate electrode of the third transistor T3 is electrically connected to the second control terminal NG2, a source electrode of the third transistor T3 is electrically connected to the first node N1, and a drain electrode of the third transistor T3 is electrically connected to the source electrode of the driving transistor T0.

The second resetting circuit 21 includes a fourth transistor T4, a gate electrode of the fourth transistor T4 is electrically connected to the second resetting control terminal PG, a source electrode of the fourth transistor T4 is electrically connected to the second initial voltage end I2, and a drain electrode of the fourth transistor T4 is electrically connected to the first node N1.

The energy storage circuit 31 includes a storage capacitor C0, the first light-emission control circuit 33 includes a fifth transistor T5, the second light-emission control circuit 34 includes a sixth transistor T6, and the data written-in circuit 32 includes a seventh transistor T7.

A gate electrode of the fifth transistor T5 is electrically connected to the light-emission control terminal E1, a source electrode of the fifth transistor T5 is electrically connected to the high voltage terminal VDD, and a drain electrode of the fifth transistor T5 is electrically connected to the drain electrode of the driving transistor T0.

A gate electrode of the sixth transistor T6 is electrically connected to the light-emission control terminal E1, a source electrode of the sixth transistor T6 is electrically connected to the source electrode of the driving transistor T0, and a drain electrode of the sixth transistor T6 is electrically connected to an anode of the organic light-emitting diode O1.

A gate electrode of the seventh transistor T7 is electrically connected to the written-in control terminal PG2, a source electrode of the seventh transistor T7 is electrically connected to the data line D1, and a drain electrode of the seventh transistor T7 is electrically connected to the drain electrode of the driving transistor T0.

A first terminal of the storage capacitor C0 is electrically connected to the gate electrode of the driving transistor T0, and a second terminal of the storage capacitor C0 is electrically connected to the high voltage terminal VDD.

The third resetting circuit 41 includes an eighth transistor T8, a gate electrode of the eighth transistor T8 is electrically connected to the third resetting control terminal PR2, a source electrode of the eighth transistor T8 is electrically connected to the third initial voltage terminal I3, and a drain electrode of the eighth transistor T8 is electrically connected to the anode of the organic light-emitting diode O1.

A cathode of the organic light-emitting diode O1 is electrically connected to the low voltage terminal VSS.

In the pixel circuit in FIG. 5, T2 and T3 are, but not limited to, both n-type thin film transistors, and T1, T4, T5, T6, T7, T8 and T0 are, but not limited to, all p-type thin film transistors.

In the pixel circuit in FIG. 5. T2 and T3 are, but not limited to, IGZO (indium gallium zinc oxide) TFTs (thin film transistors), and T1, T4, T5, T6, T7, T8 and T0 are, but not limited to, all LTPS (low temperature polysilicon) TFTs.

During the operation of the pixel circuit in FIG. 5, it is able to mitigate the hysteresis phenomenon, and provide a good display effect in FFR (first frame response) and VRR (variable refresh rate) aspects.

Figure 6:
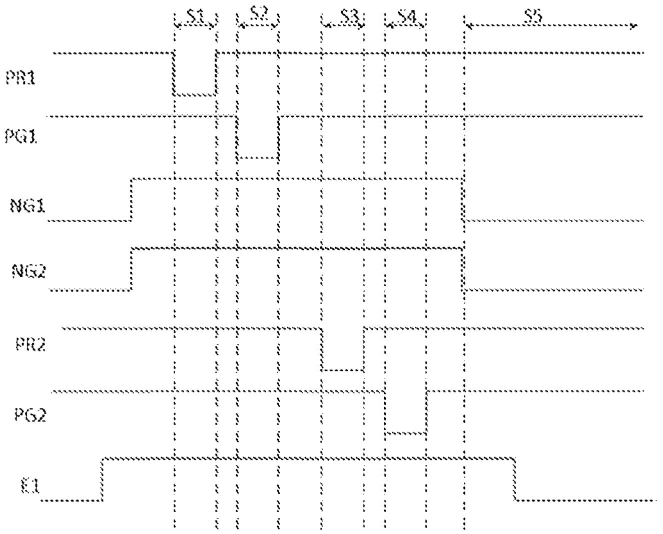
FIG. 6 is a sequence diagram of the pixel circuit in FIG. 5.

As shown in FIG. 6, during the operation of the pixel circuit in FIG. 5, the display period may include a first resetting stage S1, a second resetting stage S2, a third resetting stage S3, a charging stage S4 and a first light-emission stage S5 arranged one after another.

Figure 7A:
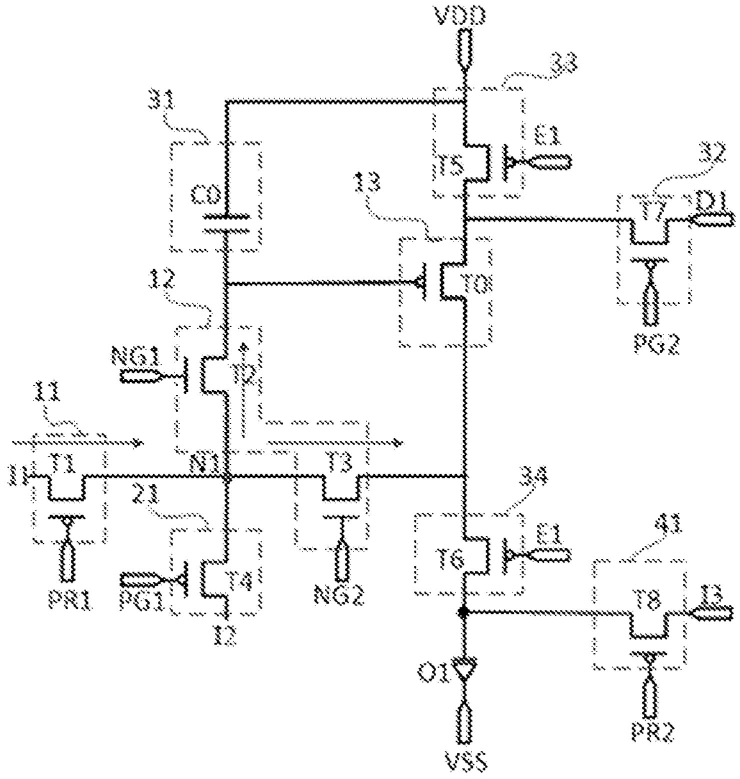
FIG. 7A is a schematic view showing an operation state of the pixel circuit in FIG. 5 at a first resetting stage according to at least one embodiment of the present disclosure.

At the first resetting stage S1, PR1 provides a low voltage signal, PG1 provides a high voltage signal, NG1 provides a high voltage signal, NG2 provides a high voltage signal, PR2 provides a high voltage signal, PG2 provides a high voltage signal. E1 provides a high voltage signal, as shown in FIG. 7A. T1, T2 and T3 are all turned on, and I1 provides a first initial voltage Vi1, so as to write the first initial voltage Vi1 into the gate electrode of T0 and the drain electrode of T0, thereby to apply a bias voltage to T0, control T0 to be in a bias state, and mitigate the hysteresis phenomenon. The first initial voltage Vi1 is a positive voltage.

At the first resetting stage S1, T4, T5, T6, T7, T8 and T0 are all turned off.

Figure 7B:
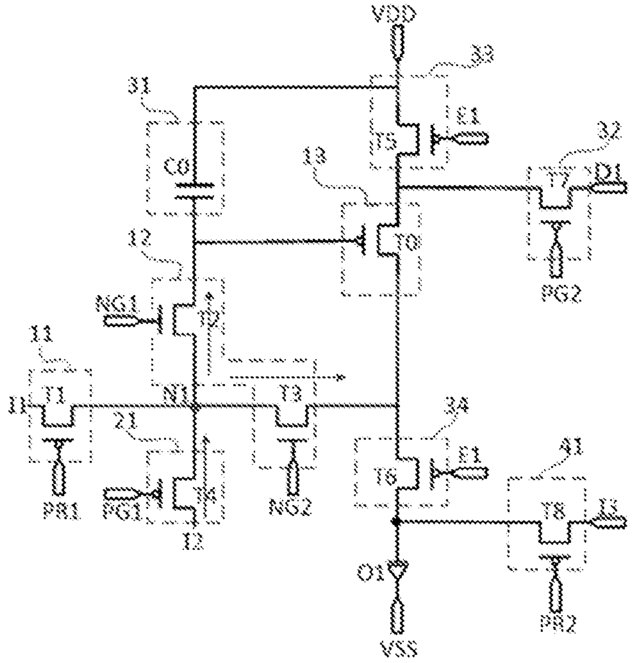
FIG. 7B is a schematic view showing an operation state of the pixel circuit in FIG. 5 at a second resetting stage according to at least one embodiment of the present disclosure.

At the second resetting stage S2, PR1 provides a high voltage signal, PG1 provides a low voltage signal, NG1 provides a high voltage signal, NG2 provides a high voltage signal, PR2 provides a high voltage signal. PG2 provides a high voltage signal, E1 provides a high voltage signal, as shown in FIG. 7B, T4, T2 and T3 are all turned on, and I2 provides a second initial voltage Vi2, so as to write the second initial voltage Vi2 into the gate electrode of T3, thereby to enable T0 to be turned on at the beginning of the charging stage S4. The second initial voltage Vi2 is written into the drain electrode of T3 so as to pull down the potential at the drain electrode of T0, thereby to provide a fast charging process at the charging stage through the data voltage Vdata (the second initial voltage Vi2 is a negative voltage, and the data voltage Vdata is a negative voltage).

At the second resetting stage S2, T1, T5, T6, T7, T8 and T0 are all turned off.

At the third resetting stage S3, PR1 provides a high voltage signal, PG1 provides a high voltage signal, NG1 provides a high voltage signal, NG2 provides a high voltage signal, PR2 provides a high voltage signal, PG2 provides a high voltage signal. T8 is turned on, and I3 provides a third initial voltage Vi3, so as to write the third initial voltage Vi3 into the anode of O1, thereby to control the O1 not to emit light, and release residual charges at the anode of O1.

At the third resetting stage S3, T1, T2, T3, T4, T5, T6, T7 and T0 are all turned off.

Figure 7C:
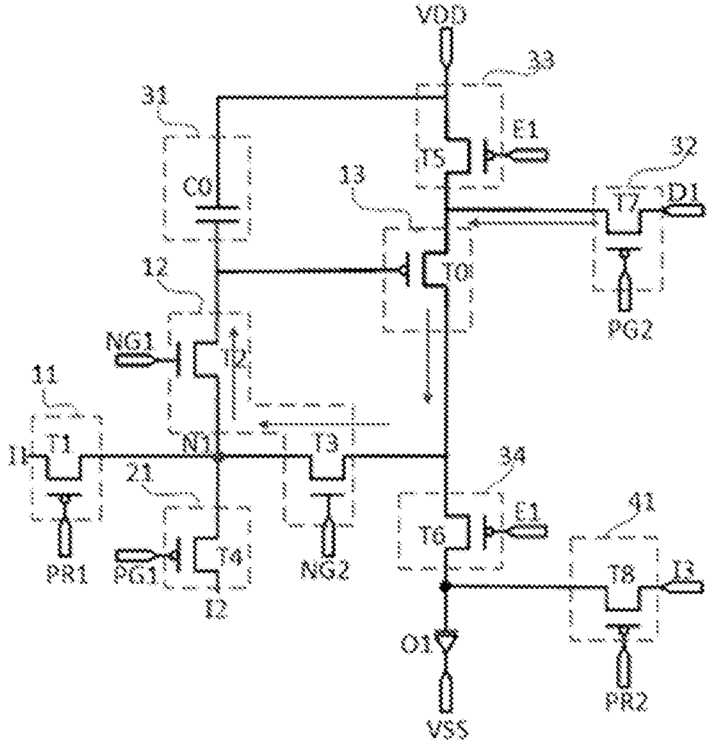
FIG. 7C is a schematic view showing an operation state of the pixel circuit in FIG. 5 at a charging stage according to at least one embodiment of the present disclosure.

At the charging stage S4, PR1 provides a high voltage signal, PG1 provides a high voltage signal, NG1 provides a high voltage signal, NG2 provides a high voltage signal, PR2 provides a high voltage signal, PG2 provides a low voltage signal, E1 provides a high voltage signal, as shown in FIG. 7C, T7 is turned on, T2 and T3 are turned on, and D1 provides a data voltage Vdata.

At the beginning of the charging stage S4, T0 is turned on, so as to charge C0 through the data voltage Vdata, thereby to pullup the potential at the gate electrode of T0 until T0 turns off, and at this time, the potential at the gate electrode of T0 is Vdata+Vth, where Vth is a threshold voltage of T0.

At the charging stage S4, T1, T4, T5, T6 and T8 are all turned off.

Figure 7D:
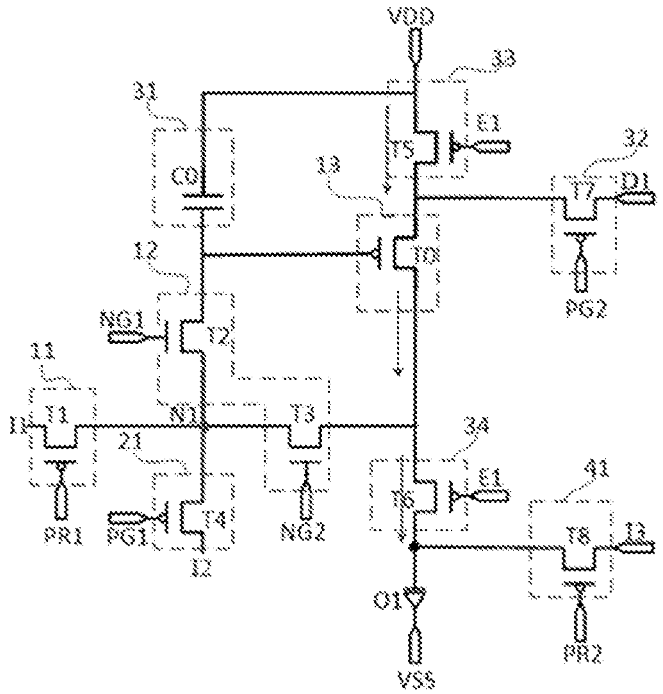
FIG. 7D is a schematic view showing an operation state of the pixel circuit in FIG. 5 at a first light-emission stage according to at least one embodiment of the present disclosure.

At the first light-emission stage S5, PR1 provides a high voltage signal, PG1 provides a high voltage signal. NG1 provides a low voltage signal, NG2 provides a low voltage signal, PR2 provides a high voltage signal, PG2 provides a high voltage signal, E1 provides a low voltage signal, as shown in FIG. 7D, T5, T6 and T0 are all turned on, and T0 drives O1 to emit light.

At the first light-emission stage S5, T1, T2, T3, T4, T7 and T8 are all turned off.

Figure 8:
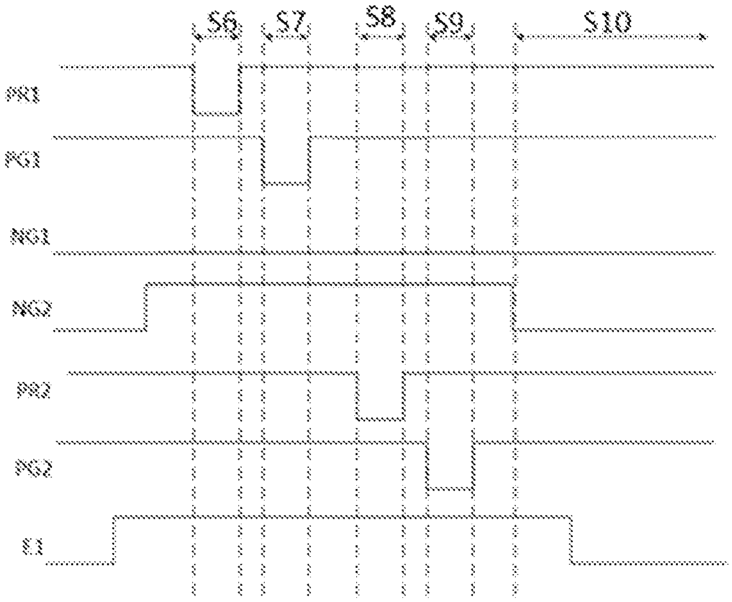
FIG. 8 is another sequence diagram of the pixel circuit in FIG. 5.

During the operation of the pixel circuit in FIG. 5, the display period includes the refresh frame and the maintaining frame in low frequency display, and the refresh frame may be the display period; as shown in FIG. 8, the maintaining frame may include a fourth resetting stage S6, a fifth resetting stage S7, a sixth resetting stage S8, a seventh resetting stage S9 and a second light-emission stage S10 arranged one after another.

In the maintaining frame, NG1 provides a low voltage signal, and T2 is turned off to control the gate electrode of T0 to be electrically disconnected from the first node N1, thereby to maintain the potential at the gate electrode of T0.

At the fourth resetting stage S6, PR1 provides a low voltage signal, PG1 provides a high voltage signal, NG2 provides a high voltage signal, PR2 provides a high voltage signal, PG2 provides a high voltage signal, E1 provides a high voltage signal, both T1 and T3 are turned on, and I1 provides a first initial voltage Vi1, so as to write the first initial voltage Vi1 into the drain electrode of T0. The first initial voltage Vi1 is a positive voltage.

At the fourth resetting stage S6, T4, T5, T6, T7 and T8 are all turned off.

At the fifth resetting stage S7, PR1 provides a high voltage signal, PG1 provides a low voltage signal, NG2 provides a high voltage signal, PR2 provides a high voltage signal, PG2 provides a high voltage signal, E1 provides a high voltage signal, both T4 and T3 are turned on, I2 provides a second initial voltage Vi2, so as to write the second initial voltage Vi2 into the drain electrode of T3.

At the fifth resetting stage S7, T1, T5, T6, T7, T8 and T0 are all turned off.

At the sixth resetting stage S8, PR1 provides a high voltage signal, PG1 provides a high voltage signal, NG2 provides a high voltage signal. PR2 provides a low voltage signal, PG2 provides a high voltage signal, E1 provides a low voltage signal, T8 is turned on, and I3 provides a third initial voltage Vi3, so as to write the third initial voltage Vi3 into the anode of O1, thereby to control the O1 not to emit light, and release residual charges at the anode of O1.

At the sixth resetting stage S8, T1, T2, T3, T4, T5, T6, T7 and T0 are all turned off.

At the seventh resetting stage S9, PR1 provides a high voltage signal, PG1 provides a high voltage signal, NG2 provides a high voltage signal, PR2 provides a high voltage signal, PG2 provides a low voltage signal, E1 provides a high voltage signal, T7 is turned on, T3 is turned on, and D1 provides a voltage signal, so as to write the voltage signal into the source electrode of T0.

At the seventh resetting stage S9, T1, T4, T5, T6 and T8 are all turned off.

At the second light-emission stage S10, PR1 provides a high voltage signal, PG1 provides a high voltage signal, NG1 provides a low voltage signal, NG2 provides a low voltage signal, PR2 provides a high voltage signal, PG2 provides a high voltage signal, E1 provides a low voltage signal, T5, T6 and T0 are all turned on, and T0 drives O1 to emit light.

At the second light-emission stage S10, T1, T2, T3, T4, T7 and T8 are all turned off.

During the operation of the pixel circuit in FIG. 5, at the fourth resetting stage S6, T0 may be, but not limited to, turned on.

During the operation of the pixel circuit in FIG. 5, at the seventh resetting stage, the voltage signal from the data line D1 may be a data voltage Vdata, and a voltage value of the data voltage Vdata may be, e.g., greater than or equal to 1V and less than or equal to 6.5 V.

Alternatively, at the seventh resetting stage, the voltage signal from the data line D1 may be a resetting voltage signal, and a voltage value of the resetting voltage signal may be greater than or equal to 4.6V and less than or equal to 7 V. However, the present disclosure is not limited thereto.

During the operation of the pixel circuit in FIG. 5, at the seventh resetting stage, T7 is turned on to write the voltage signal from the data line D1 into the second terminal of the driving circuit 13, so as to apply a bias voltage to T0, thereby to enable T0 to be in a bias state, and mitigate the hysteresis phenomenon.

The present disclosure provides in some embodiments a method for driving the above-mentioned pixel circuit. A display period includes a first resetting stage and a second resetting stage arranged one after another, and the method includes: at the first resetting stage, writing, by the first resetting circuit, the first initial voltage from the first initial voltage terminal into the first node under control of the first resetting control signal, controlling, by the control circuit, the control terminal of the driving circuit to be electrically connected to the first node under control of the first control signal, and controlling, by the control circuit, the first node to be electrically connected to the first terminal of the driving circuit under control of the second control signal; at the second resetting stage, controlling, by the control circuit, the control terminal of the driving circuit to be electrically connected to the first node under control of the first control signal, and controlling, by the control circuit, the first node to be electrically connected to the first terminal of the driving circuit under control of the second control signal.

In the method according to the embodiment of the present disclosure, at the first resetting stage, the first resetting circuit writes the first initial voltage into the first node, the control circuit controls the control terminal of the driving circuit to be electrically connected to the first node, and controls the first node to be electrically connected to the first terminal of the driving circuit, so as to enable the potential at the control terminal of the driving circuit and the potential at the first terminal of the driving circuit to be the first initial voltage, thereby to apply a bias voltage to the driving transistor of the driving circuit, enable the driving transistor of the driving circuit to be in a bias state, mitigate a hysteresis phenomenon, and improve a display effect.

In at least one embodiment of the present disclosure, the pixel circuit further includes a second resetting circuit, the method further includes: at the second resetting stage, writing, by the second resetting circuit, a second initialization voltage from a second initial voltage terminal into the first node under control of a second resetting control signal, so as to enable the driving transistor of the driving circuit to be turned on at the beginning of the charging stage.

In at least one embodiment of the present disclosure, the pixel circuit further includes an energy storage circuit, a data written-in circuit, a first light-emission control circuit and a second light-emission control circuit, the display period further includes a charging stage and a first light-emission stage after the second resetting stage, and the method further includes: at the charging stage, writing, by the data written-in circuit, a data voltage from a data line into a second terminal of the driving circuit under control of a written-in control signal, controlling, by the control circuit, the control terminal of the driving circuit to be electrically connected to the first node under control of the first control signal, and controlling, by the control circuit, the first node to be electrically connected to the first terminal of the driving circuit under control of the second control signal; at the beginning of the charging stage, controlling, by the driving circuit, the first terminal of the driving circuit to be electrically connected to the second terminal of the driving circuit under control of a potential at the control terminal of the driving circuit, to charge the energy storage circuit via the data voltage, thereby to change the potential at the control terminal of the driving circuit for threshold voltage compensation until the first terminal of the driving circuit is electrically disconnected from the second terminal of the driving circuit; at the first light-emission stage, controlling, by the first light-emission control circuit, a first voltage terminal to be electrically connected to the second terminal of the driving circuit under control of a light-emission control signal, controlling, by the second light-emission control circuit, the first terminal of the driving circuit to be electrically connected to a first electrode of the light-emitting element under control of the light-emission control signal, and driving, by the driving circuit, the light-emitting element to emit light.

In at least one embodiment of the present disclosure, the pixel circuit further includes a third resetting circuit, the display period further includes a third resetting stage between the second resetting stage and the charging stage, and the method further includes: at the third resetting stage, writing, by the third resetting circuit, a third initial voltage from the third initial voltage terminal into the first electrode of the light-emitting element under control of a third resetting control signal, so as to control the light-emitting element not to emit light, and release residual charges at the first electrode of the light-emitting element.

In at least one embodiment of the present disclosure, during low frequency display, a display period includes a refresh frame and a maintaining frame, the refresh frame is the display period, the maintaining frame includes a fourth resetting stage, a fifth resetting stage, a sixth resetting stage, a seventh resetting stage and a second light-emission stage arranged one after another, and the method further includes: in the maintaining frame, controlling, by the control circuit, the control terminal of the driving circuit to be electrically disconnected from the first node under control of the first control signal from the first control terminal; at the fourth resetting stage, writing, by the first resetting circuit, the first initial voltage from the first initial voltage terminal into the first node under control of the first resetting control signal, and controlling, by the control circuit, the first node to be electrically connected to the first terminal of the driving circuit under control of the second control signal, to write the first initial voltage into the first terminal of the driving circuit; at the fifth resetting stage, writing, by the second resetting circuit, the second initialization voltage from the second initial voltage terminal into the first node under control of the second resetting control signal, and controlling, by the control circuit, the first node to be electrically connected to the first terminal of the driving circuit under control of the second control signal, to write the second initialization voltage into the first terminal of the driving circuit; at the sixth resetting stage, writing, by the third resetting circuit, the third initial voltage from the third initial voltage terminal into the first electrode of the light-emitting element under control of the third resetting control signal; at the seventh resetting stage, writing, by the data written-in circuit, a voltage signal from the data line into the second terminal of the driving circuit under control of the written-in control signal; at the second light-emission stage, controlling, by the first light-emission control circuit, the first voltage terminal to be electrically connected to the second terminal of the driving circuit under control of the light-emission control signal, controlling, by the second light-emission control circuit, the first terminal of the driving circuit to be electrically connected to the first electrode of the light-emitting element under control of the light-emission control signal, and driving, by the driving circuit, the light-emitting element to emit light.

The present disclosure further provides in some embodiments a display device including the above-mentioned pixel circuit.

The display device may be any product or member having a display function, e.g., mobile phone, tablet computer, television, display, laptop computer, digital photo frame, or navigator.

The above embodiments are for illustrative purposes only, but the present disclosure is not limited thereto. Apparently, a person skilled in the art may make further modifications and improvements without departing from the spirit of the present disclosure, and these modifications and improvements shall also fall within the scope of the present disclosure.

What is claimed is:

1. A method for driving a pixel circuit, wherein the pixel circuit comprises a light-emitting element, a first resetting circuit, a control circuit and a driving circuit, wherein the first resetting circuit is electrically connected to a first resetting control terminal, a first initial voltage terminal and a first node, and configured to write a first initial voltage from the first initial voltage terminal into the first node under control of a first resetting control signal from the first resetting control terminal;

the control circuit is electrically connected to a first control terminal, a second control terminal, the first node, a control terminal of the driving circuit and a first terminal of the driving circuit, and configured to control the control terminal of the driving circuit to be electrically connected to the first node under control of a first control signal from the first control terminal, and control the first node to be electrically connected to the first terminal of the driving circuit under control of a second control signal from the second control terminal;

the first terminal of the driving circuit is electrically connected to the light-emitting element, and the driving circuit is configured to drive the light-emitting element to emit light;

wherein a display period comprises a first resetting stage and a second resetting stage arranged one after another, and the method comprises:

at the first resetting stage, writing, by the first resetting circuit, the first initial voltage from the first initial voltage terminal into the first node under control of the first resetting control signal, controlling, by the control circuit, the control terminal of the driving circuit to be electrically connected to the first node under control of the first control signal, and controlling, by the control circuit, the first node to be electrically connected to the first terminal of the driving circuit under control of the second control signal;

at the second resetting stage, controlling, by the control circuit, the control terminal of the driving circuit to be electrically connected to the first node under control of the first control signal, and controlling, by the control circuit, the first node to be electrically connected to the first terminal of the driving circuit under control of the second control signal.

2. The method according to claim 1, wherein the pixel circuit further comprises a second resetting circuit, and the method further comprises:

at the second resetting stage, writing, by the second resetting circuit, a second initialization voltage from a second initial voltage terminal into the first node under control of a second resetting control signal.

3. The method according to claim 2, wherein the pixel circuit further comprises an energy storage circuit, a data written-in circuit, a first light-emission control circuit and a second light-emission control circuit, the display period further comprises a charging stage and a first light-emission stage after the second resetting stage, and the method further comprises:

at the charging stage, writing, by the data written-in circuit, a data voltage from a data line into a second terminal of the driving circuit under control of a written-in control signal, controlling, by the control circuit, the control terminal of the driving circuit to be electrically connected to the first node under control of the first control signal, and controlling, by the control circuit, the first node to be electrically connected to the first terminal of the driving circuit under control of the second control signal;

at the beginning of the charging stage, controlling, by the driving circuit, the first terminal of the driving circuit to be electrically connected to the second terminal of the driving circuit under control of a potential at the control terminal of the driving circuit, to charge the energy storage circuit via the data voltage, thereby to change the potential at the control terminal of the driving circuit until the first terminal of the driving circuit is electrically disconnected from the second terminal of the driving circuit;

at the first light-emission stage, controlling, by the first light-emission control circuit, a first voltage terminal to be electrically connected to the second terminal of the driving circuit under control of a light-emission control signal, controlling, by the second light-emission control circuit, the first terminal of the driving circuit to be electrically connected to a first electrode of the light-emitting element under control of the light-emission control signal, and driving, by the driving circuit, the light-emitting element to emit light.

4. The method according to claim 3, wherein the pixel circuit further comprises a third resetting circuit, the display period further comprises a third resetting stage between the second resetting stage and the charging stage, and the method further comprises:

at the third resetting stage, writing, by the third resetting circuit, a third initial voltage from the third initial voltage terminal into the first electrode of the light-emitting element under control of a third resetting control signal.

5. The method according to claim 4, wherein during low frequency display, a display period comprises a refresh frame and a maintaining frame, the refresh frame is the display period, the maintaining frame comprises a fourth resetting stage, a fifth resetting stage, a sixth resetting stage, a seventh resetting stage and a second light-emission stage arranged one after another, and the method further comprises:

in the maintaining frame, controlling, by the control circuit, the control terminal of the driving circuit to be electrically disconnected from the first node under control of the first control signal from the first control terminal;

at the fourth resetting stage, writing, by the first resetting circuit, the first initial voltage from the first initial voltage terminal into the first node under control of the first resetting control signal, and controlling, by the control circuit, the first node to be electrically connected to the first terminal of the driving circuit under control of the second control signal, to write the first initial voltage into the first terminal of the driving circuit;

at the fifth resetting stage, writing, by the second resetting circuit, the second initialization voltage from the second initial voltage terminal into the first node under control of the second resetting control signal, and controlling, by the control circuit, the first node to be electrically connected to the first terminal of the driving circuit under control of the second control signal, to write the second initialization voltage into the first terminal of the driving circuit;

at the sixth resetting stage, writing, by the third resetting circuit, the third initial voltage from the third initial voltage terminal into the first electrode of the light-emitting element under control of the third resetting control signal;

at the seventh resetting stage, writing, by the data written-in circuit, a voltage signal from the data line into the second terminal of the driving circuit under control of the written-in control signal;

at the second light-emission stage, controlling, by the first light-emission control circuit, the first voltage terminal to be electrically connected to the second terminal of the driving circuit under control of the light-emission control signal, controlling, by the second light-emission control circuit, the first terminal of the driving circuit to be electrically connected to the first electrode of the light-emitting element under control of the light-emission control signal, and driving, by the driving circuit, the light-emitting element to emit light.

6. A pixel circuit, comprising a light-emitting element, a first resetting circuit, a control circuit and a driving circuit, wherein the first resetting circuit is electrically connected to a first resetting control terminal, a first initial voltage terminal and a first node, and during a first resetting stage of a display period, the first resetting circuit is configured to write a first initial voltage from the first initial voltage terminal into the first node under control of a first resetting control signal from the first resetting control terminal;

the control circuit is electrically connected to a first control terminal, a second control terminal, the first node, a control terminal of the driving circuit and a first terminal of the driving circuit, and during the first resetting stage and a second resetting stage arranged one after another in the display period, the control circuit is configured to control the control terminal of the driving circuit to be electrically connected to the first node under control of a first control signal from the first control terminal, and control the first node to be electrically connected to the first terminal of the driving circuit under control of a second control signal from the second control terminal; and the first terminal of the driving circuit is electrically connected to the light-emitting element, and the driving circuit is configured to drive the light-emitting element to emit light.

7. The pixel circuit according to claim 6, further comprising a second resetting circuit, wherein the second resetting circuit is electrically connected to a second resetting control terminal, a second initial voltage terminal and the first node, and configured to write a second initialization voltage from the second initial voltage terminal into the first node under control of a second resetting control signal from the second resetting control terminal.

8. The pixel circuit according to claim 7, wherein the second resetting circuit comprises a fourth transistor, a control electrode of the fourth transistor is electrically connected to the second resetting control terminal, a first electrode of the fourth transistor is electrically connected to the second initial voltage terminal, and a second electrode of the fourth transistor is electrically connected to the first node.

9. The pixel circuit according to claim 6, further comprising an energy storage circuit, a data written-in circuit, a first light-emission control circuit and a second light-emission control circuit; wherein a first terminal of the energy storage circuit is electrically connected to the control terminal of the driving circuit, a second terminal of the energy storage circuit is electrically connected to a first voltage terminal, and the energy storage circuit is configured to store electric energy;

the first light-emission control circuit is electrically connected to a light-emission control terminal, the first voltage terminal and a second terminal of the driving circuit, and configured to control the first voltage terminal to be electrically connected to the second terminal of the driving circuit under control of a light-emission control signal from the light-emission control terminal;

the second light-emission control circuit is electrically connected to the light-emission control terminal, the first terminal of the driving circuit and a first electrode of the light-emitting element, and configured to control the first terminal of the driving circuit to be electrically connected to the first electrode of the light-emitting element under control of the light-emission control signal;

the data written-in circuit is electrically connected to a written-in control terminal, a data line and the second terminal of the driving circuit, and configured to write a data voltage from the data line into the second terminal of the driving circuit under control of a written-in control signal from the written-in control terminal;

a second electrode of the light-emitting element is electrically connected to a second voltage terminal.

10. The pixel circuit according to claim 9, further comprising a third resetting circuit, wherein the third resetting circuit is electrically connected to a third resetting control terminal, the first electrode of the light-emitting element and a third initial voltage terminal, and configured to write a third initial voltage from the third initial voltage terminal into the first electrode of the light-emitting element under control of a third resetting control signal from the third resetting control terminal.

11. The pixel circuit according to claim 10, wherein the third resetting circuit comprises an eighth transistor, a control electrode of the eighth transistor is electrically connected to the third resetting control terminal, a first electrode of the eighth transistor is electrically connected to the third initial voltage terminal, and a second electrode of the eighth transistor is electrically connected to the first electrode of the light-emitting element.

12. The pixel circuit according to claim 9, wherein the energy storage circuit comprises a storage capacitor, the first light-emission control circuit comprises a fifth transistor, the second light-emission control circuit comprises a sixth transistor, the driving circuit comprises a driving transistor, and the data written-in circuit comprises a seventh transistor;

a control electrode of the fifth transistor is electrically connected to the light-emission control terminal, a first electrode of the fifth transistor is electrically connected to the first voltage terminal, and a second electrode of the fifth transistor is electrically connected to the second terminal of the driving circuit;

a control electrode of the sixth transistor is electrically connected to the light-emission control terminal, a first electrode of the sixth transistor is electrically connected to the first terminal of the driving circuit, and a second electrode of the sixth transistor is electrically connected to the first electrode of the light-emitting element;

a control electrode of the seventh transistor is electrically connected to the written-in control terminal, a first electrode of the seventh transistor is electrically connected to the data line, and a second electrode of the seventh transistor is electrically connected to the second terminal of the driving circuit;

a first terminal of the storage capacitor is electrically connected to the control terminal of the driving circuit, and a second terminal of the storage capacitor is electrically connected to the first voltage terminal;

a control electrode of the driving transistor is the control terminal of the driving circuit, a first electrode of the driving transistor is the first terminal of the driving circuit, and a second electrode of the driving transistor is the second terminal of the driving circuit.

13. The pixel circuit according to claim 6, wherein the first resetting circuit comprises a first transistor, a control electrode of the first transistor is electrically connected to the first resetting control terminal, a first electrode of the first transistor is electrically connected to the first initial voltage terminal, and a second electrode of the first transistor is electrically connected to the first node.

14. The pixel circuit according to claim 6, wherein the control circuit comprises a second transistor and a third transistor;

a control electrode of the second transistor is electrically connected to the first control terminal, a first electrode of the second transistor is electrically connected to the first node, and a second electrode of the second transistor is electrically connected to the control terminal of the driving circuit;

a control electrode of the third transistor is electrically connected to the second control terminal, a first electrode of the third transistor is electrically connected to the first node, and a second electrode of the third transistor is electrically connected to the first terminal of the driving circuit.

15. A display device comprising the pixel circuit according to claim 6.

16. The display device according to claim 15, wherein the pixel circuit further comprises a second resetting circuit, wherein the second resetting circuit is electrically connected to a second resetting control terminal, a second initial voltage terminal and the first node, and configured to write a second initialization voltage from the second initial voltage terminal into the first node under control of a second resetting control signal from the second resetting control terminal.

17. The display device according to claim 15, wherein the pixel circuit further comprises an energy storage circuit, a data written-in circuit, a first light-emission control circuit and a second light-emission control circuit; wherein a first terminal of the energy storage circuit is electrically connected to the control terminal of the driving circuit, a second terminal of the energy storage circuit is electrically connected to a first voltage terminal, and the energy storage circuit is configured to store electric energy;

the first light-emission control circuit is electrically connected to a light-emission control terminal, the first voltage terminal and a second terminal of the driving circuit, and configured to control the first voltage terminal to be electrically connected to the second terminal of the driving circuit under control of a light-emission control signal from the light-emission control terminal;

the second light-emission control circuit is electrically connected to the light-emission control terminal, the first terminal of the driving circuit and a first electrode of the light-emitting element, and configured to control the first terminal of the driving circuit to be electrically connected to the first electrode of the light-emitting element under control of the light-emission control signal;

the data written-in circuit is electrically connected to a written-in control terminal, a data line and the second terminal of the driving circuit, and configured to write a data voltage from the data line into the second terminal of the driving circuit under control of a written-in control signal from the written-in control terminal;

a second electrode of the light-emitting element is electrically connected to a second voltage terminal.

18. The display device according to claim 17, wherein the pixel circuit further comprises a third resetting circuit, wherein the third resetting circuit is electrically connected to a third resetting control terminal, the first electrode of the light-emitting element and a third initial voltage terminal, and configured to write a third initial voltage from the third initial voltage terminal into the first electrode of the light-emitting element under control of a third resetting control signal from the third resetting control terminal.

19. The display device according to claim 15, wherein the first resetting circuit comprises a first transistor, a control electrode of the first transistor is electrically connected to the first resetting control terminal, a first electrode of the first transistor is electrically connected to the first initial voltage terminal, and a second electrode of the first transistor is electrically connected to the first node.

20. The display device according to claim 15, wherein the control circuit comprises a second transistor and a third transistor;

a control electrode of the second transistor is electrically connected to the first control terminal, a first electrode of the second transistor is electrically connected to the first node, and a second electrode of the second transistor is electrically connected to the control terminal of the driving circuit;

a control electrode of the third transistor is electrically connected to the second control terminal, a first electrode of the third transistor is electrically connected to the first node, and a second electrode of the third transistor is electrically connected to the first terminal of the driving circuit.

* * * * *